United States Patent
Marcos Moreira Da Silva et al.

(10) Patent No.: US 12,145,466 B2
(45) Date of Patent: Nov. 19, 2024

(54) INTELLIGENT CHARGING SYSTEM FOR ELECTRIC VEHICLE BATTERIES IN DIRECT CURRENT

(71) Applicant: I-CHARGING, MOBILIDADE ELECTRICA, S.A., Oporto (PT)

(72) Inventors: Pedro Nuno Marcos Moreira Da Silva, Oporto (PT); Vitor Alexandre Martins Ferreira, Guimarães (PT); Susana Marinho Ferreira Guedes, Maia (PT); Paulo Delfim Oliveira Rodrigues, Requião (PT)

(73) Assignee: I-CHARGING, MOBILIDADE ELECTRICA, S.A., Oporto (PT)

( * ) Notice: Subject to any disclaimer, the term of this patent is extended or adjusted under 35 U.S.C. 154(b) by 43 days.

(21) Appl. No.: 18/012,634

(22) PCT Filed: May 25, 2021

(86) PCT No.: PCT/IB2021/054522
§ 371 (c)(1),
(2) Date: Dec. 22, 2022

(87) PCT Pub. No.: WO2022/003441
PCT Pub. Date: Jan. 6, 2022

(65) Prior Publication Data
US 2023/0256860 A1 Aug. 17, 2023

(30) Foreign Application Priority Data
Jun. 30, 2020 (PT) ........................................ 116537

(51) Int. Cl.
*B60L 53/60* (2019.01)
*B60L 53/18* (2019.01)
(Continued)

(52) U.S. Cl.
CPC ............... *B60L 53/68* (2019.02); *B60L 53/18* (2019.02); *B60L 53/67* (2019.02); *H02J 1/10* (2013.01);
(Continued)

(58) Field of Classification Search
CPC .......... B60L 53/68; B60L 53/18; B60L 53/67; H02J 13/00
See application file for complete search history.

(56) References Cited

U.S. PATENT DOCUMENTS 5,306,999 A * 4/1994 Hoffman ................. B60L 53/16
320/109
10,986,971 B1 * 4/2021 Ebrahimi Afrouzi ... B60L 53/18
(Continued)

OTHER PUBLICATIONS

PCT International Search Report for International Application No. PCT/IB2021/054522, mailed Sep. 6, 2021, 4pp.
(Continued)

*Primary Examiner* — Jared Fureman
*Assistant Examiner* — Esayas G Yeshaw
(74) *Attorney, Agent, or Firm* — The Roy Gross Law Firm, LLC; Roy Gross

(57) ABSTRACT

The present document describes an intelligent charging system in direct current for electric vehicle batteries. The developed system, based on the concept of modularity, allows an intelligent, simultaneous and sequential charging of different vehicle models available on the market. Its modularity makes it possible to charge electric vehicle batteries at maximum powers that are a multiple of a given unit power, for example 50 kW, the only limitation for the total power of the charging system is the availability of the electrical power supply on which it depends, whether it's alternating current or direct current, coming from the electrical grid or other sources such as: local generation, energy storage banks, electrical traction grids, among others.

7 Claims, 5 Drawing Sheets

(51) Int. Cl.
  *B60L 53/67* (2019.01)
  *B60L 53/68* (2019.01)
  *H02J 1/10* (2006.01)
  *H02J 13/00* (2006.01)
  *B60L 53/10* (2019.01)
(52) U.S. Cl.
  CPC .. *H02J 13/00002* (2020.01); *H02J 13/00006* (2020.01); *B60L 53/11* (2019.02)

(56) References Cited

U.S. PATENT DOCUMENTS

| | | | |
|---|---|---|---|
| 2011/0074351 A1* | 3/2011 | Bianco | B60L 53/31 320/109 |
| 2013/0069592 A1 | 3/2013 | Bouman | |
| 2013/0307466 A1 | 11/2013 | Frisch et al. | |
| 2015/0326040 A1 | 11/2015 | Kawai et al. | |
| 2015/0346698 A1 | 12/2015 | Mailloux et al. | |
| 2017/0246961 A1 | 8/2017 | Lee et al. | |
| 2017/0274792 A1 | 9/2017 | Vaughan et al. | |
| 2018/0001781 A1 | 1/2018 | Quattrini, Jr. et al. | |
| 2018/0205235 A1 | 7/2018 | Yuan | |
| 2018/0370372 A1 | 12/2018 | Silorio et al. | |
| 2019/0047430 A1* | 2/2019 | Götz | B60L 53/14 |
| 2019/0375308 A1* | 12/2019 | Vaughan | B60L 53/63 |
| 2022/0258632 A1* | 8/2022 | Ehrenhalt | B60L 53/305 |
| 2023/0079973 A1* | 3/2023 | Steinbacher | B60L 53/18 320/109 |

OTHER PUBLICATIONS

PCT Written Opinion for International Application No. PCT/IB2021/054522, mailed Sep. 6, 2021, 9pp.

PCT International Preliminary Report on Patentability for International Application No. PCT/IB2021/054522, issued Dec. 13, 2022, 10pp.

* cited by examiner

INTELLIGENT CHARGING SYSTEM FOR ELECTRIC VEHICLE BATTERIES IN DIRECT CURRENT

CROSS REFERENCE TO RELATED APPLICATIONS

This application is a National Phase of PCT Patent Application No. PCT/IB2021/054522 having International filing date of May 25, 2021, which claims the benefit of priority of Portuguese Patent Application No. 116537, filed Jun. 30, 2020, the contents of which are all incorporated herein by reference in their entirety.

Technical Domain

The present document describes an intelligent charging system in direct current for electric vehicle batteries.

BACKGROUND

Currently, one of the biggest concerns of electric mobility is the correct power dimensioning of the charging areas, so that it is more efficient when they have more than one fast or ultra-fast charger, and the power supplied by the upstream grid is limited.

Considering an example wherein the electrical grid provides an apparent power of 1.2 MVA for an area with six ultra-fast charging stations, with two outputs each, wherein each charger can provide 350 kW. For simplicity, and considering that the active power consumed by the chargers is equal to the apparent power, which is not far from reality as the power factor of the current chargers is close to 1, there are therefore 1.2 MW of active power to be used and distributed by the six chargers of 350 kW each, or more precisely by the 12 outputs, each one being capable of supplying 350 kW.

In this case, although each station can provide power of 350 kW (Py) at each output, it is not possible for users to use such power simultaneously, as this would overload the available grid connection. Thus, when the maximum power is being supplied at 3 outputs, none of the remaining outputs can be used, or generalizing: in each instant the average power that can be supplied at several outputs simultaneously is 1.2 MW divided by the number of outputs in use at any given time, with any criteria.

In the example shown with 12 outputs charging simultaneously, and according to the power provided by the grid, it is only possible to use 100 kW per output as an average value. However, the total installed conversion power capacity is 6×350 kW, i.e.: 2.1 MW. This was the amount of conversion power that the operator had to invest in order to be able to supply 350 kW at any output, although assumed from the start that he would never supply more than a total 1.2 MW simultaneously.

The solution adopted in the proposed system, and disclosed in this document aims at overcoming this difficulty. With the present solution, only the maximum target power is installed, and it is dynamically allocated to each output in fractions of a defined value, using a criteria defined in the power management system and transmitted to each charger.

SUMMARY

The present invention describes an intelligent charging system for electric vehicle batteries, comprising at least one charging station with at least one direct current charging output; a power block, electrically powered by a low voltage grid, comprised of at least one power unit, comprising a power controller, and at least one power cell, internally controlled by the power controller; and a HUB comprising a controller, and a power selector, internally controlled by the controller; wherein the power controllers are connected to the controller via a communications network, and wherein the controller dynamically controls the power provided by the direct current charging network to the charging station, supplied by the at least one power cell, acting on the power selector and on the power controller.

In a proposed embodiment of present invention, the power supply of the power block comprises energy sources such as local generation, storage banks, electrical traction grids, or others.

Yet in another proposed embodiment of present invention, the at least one power cell comprises a predefined maximum unit power value.

Yet in another proposed embodiment of present invention, the HUB further comprises a router which enables communication with remote charging management systems and/or monitoring systems and/or a mobile phone application using wired or wireless telecommunications networks.

Yet in another proposed embodiment of present invention, the charging station comprises a user interface and interface controllers.

Yet in another proposed embodiment of present invention, the at least one charging output allows the use of different charging standards.

Yet in another proposed embodiment of present invention, the charging station comprises an interface comprised of at least one large touch-sensitive screen.

Yet in another proposed embodiment of present invention, the interface comprises a two-way audio system.

Yet in another proposed embodiment of present invention, the at least one large touch-sensitive screen and the two-way audio system facilitate the interaction and operation of the charging station and the broadcast of multimedia content.

Yet in another proposed embodiment of present invention, the charging station further comprises a cable management system.

Yet in another proposed embodiment of present invention, the monitoring systems perform the permanent monitoring of the system, optimizing the decision process on the need for preventive and/or corrective maintenance actions based on predictive algorithms.

The present application further describes a method of operation of the intelligent charging system for electric vehicle batteries described above which comprises the steps of:
- checking whether the used or desired power is zero or not, validating the start or not of a new charging session;
- in case of a new charging session starts, the central command of the charging stations defines the charging priority for each output, based on the previously defined criteria;
- in case there isn't a new charging session, the central command of each charging station calculates the power used for charging at each output and the power desired by the vehicles at the same time;
- subsequently, the charging stations send the power used for charging at each output, the desired power and the respective priorities via the communications network to the HUB;
- after receiving the value of the maximum power provided by the grid through the communications network, the controller of the HUB determines the maximum available power for each output of the charging station, and also determines the maximum power that each power unit can collect from the grid;

the controller then defines the allocation of the power cells of each power unit at each charging station output according to priorities and needs based on previously defined criteria, sending to the central command of each charging station the power that each output can use for charging;

the controller also sends to the power controller of each power unit the power that each power cell must inject into the direct current charging network, the power controller of each power unit being responsible for checking the availability of the power cells, subsequently sending that information to the HUB via the communications network.

BRIEF DESCRIPTION

The present document describes an intelligent charging system for electric vehicle batteries in direct current. The developed system, based on the concept of modularity, allows an intelligent, simultaneous and sequential charging of different vehicle models available on the market.

The charging of electric vehicles depends on several parameters, including the nominal charging voltage, the total energy storage capacity of the batteries, and the maximum power at which they can be charged. Even considering different models of the same brand, these parameters are different, reflected in the information presented to the public, such as vehicle autonomy and charging time. These differences mean that charger manufacturers have to develop and implement solutions compatible with all electric vehicles, those already on the market, and those that will emerge in the future.

To face this challenge, it is necessary for vehicles to be charged in an intelligent way, allowing charging power to be made available to a vehicle that accepts higher charging powers than it is being charged, as soon as another user finishes charging or no longer needs such high power.

With the proposed solution, it is possible to distribute in an intelligent way the power available upstream among several users of electric vehicles downstream. Taking the type of electric vehicle being charged into account, it will be possible to dynamically supply power to a vehicle, even if other vehicles are using other outputs in the same charging station, or any other, as the solution is integrated and scalable.

A matrix where the outputs are interconnected with the inputs, makes it possible to direct the available power to any of the outputs, being able to supply different values to each of the vehicles. On the users' side, this management allows them to enjoy an optimization of the charging power, which in practice translates into the reduction of the expected time of a fast or ultra-fast charge. On the infrastructure side, it is no longer necessary to oversize the installation in order to provide the highest power at outputs, when vehicles with lower charging power do not require it. All of this translates into a considerable reduction in investment and costs.

In addition to the dimensioning of the charging areas and the diversity of vehicles to be charged, there was also a need in electric mobility to expand and guarantee service to electric vehicle fleets, for example electric buses, to carry out charging overnight, sometimes using the same charger for more than 1 vehicle in a row, and desirably without having to authenticate the vehicles in person or change the connection from one vehicle to the next to start charging cycles. For these cases, the available solutions on the market only allow sequential charging, being only possible for a vehicle to start charging when the previous one ends its own cycle.

The originality of the solution is related to the design of the system architecture and the development and application of a range of technical solutions adapted to the relevant technology. It is a charging system without conceptual limits, with the possibility of carrying out sequential and simultaneous charging, thus overcoming the limitations of existing solutions on the market.

The solution's modularity makes it possible to charge batteries with multiple maximum powers of a given unit power, for example 50 kW, the only limitation is the availability of the electrical power supply on which it depends, whether it's alternating current or direct current, coming from the electrical grid or other sources such as local generation, energy storage banks, electrical traction grids, among others.

The developed system complies with the specifications of the existing Combined Charging System (CCS) and CHAdeMO standards, being able to be applied to other standards in any power, and for use in any situation of charging use cases.

The system has advantages in the areas of fast and ultra-fast charging, compatible with the typologies being implemented in Europe, the United States of America and other geographies, where a greater number of chargers is currently being installed per site, taking into account the apparent installed power that is lower than the chargers' power were able to provide, in case they were all operating simultaneously at maximum power.

The presented solution therefore allows to optimize the investment in the infrastructures, minimizing implementation, operation and maintenance costs. The solution can also be implemented in stand-alone mode, that is, only the power component and user interface with at least two outputs.

It can be integrated into a system using renewable energies, with charging operation and management systems, real-time monitoring of chargers and data collection.

The objective of the present system is to overcome some technical gaps existing in current car battery charging systems, improving the management process and supply of charging power.

The main novelty of the present invention is based on the dynamic allocation of the available conversion power to the different charging outputs, allowing to serve more vehicles and/or more quickly, with a total installed power lower than the existing solutions, which translates into a more efficient operation, with less total investment and greater use of the total power available in the system supply.

The currently known systems see the set of chargers as the sum of the charging units, to which a power limitation is eventually imposed if the installation requires it due to a total power limitation, usually referred as Dynamic Load Management or Load Management or Load Balancing. In the approach proposed herein, the set of chargers is seen as a system, wherein a dynamic allocation of conversion power is made with one or more chargers, a greater efficiency in operation being achieved, with less total installed power.

With this solution it is possible to have different unit power values in each output and with any combination of direct current charging standards. The introduction of these innovative features is possible thanks to the design of the system with a distributed control architecture. Thus, it is possible to obtain a charger with outputs complying with the CCS, CHAdeMO, GB/T, Chaoji or other standards in use, in any combination and number.

Innovations have also been introduced in relation to the present state of the art regarding the combination of sequential charging with simultaneous charging, allowing important timing gains to be achieved in charging of vehicle fleets, as is the case of public transport vehicles. User interfaces with large touch-sensitive screens are also introduced, with the possibility of using the display for the broadcast of diverse contents.

In addition to the aforementioned, the system also incorporates an innovative device for extending and retracting the charging cable using a motorized system.

The system also allows remote access to monitor the status of the components of the charging station, that combined with data collection and analysis, with algorithms based on artificial intelligence, will provide an optimization of preventive and corrective maintenance.

Returning to the previously presented example, we will again consider the maximum total power supplied by the Px grid to the charging area with a value of 1.2 MW, wherein power is converted by power modules with, for example 50 kW, making a total of 1.2 MW converted power equal to Px. The power modules are dynamically allocated to each output N, according to the charging needs of the different vehicles being charged.

In the architecture of the new solution, the N outputs are connected to the same power block, which makes it possible to manage the available power according to the number of users and the different needs of each vehicle.

This new solution has the advantage, compared to the known technologies, that the total installed conversion power is 1.2 MW instead of 2.1 MW as in the example shown. Thus, in this example based on typical cases, it is possible to save 0.9 MW of conversion capacity, i.e., 43% less, with evident economic and environmental gains, offering greater return on investment and freeing up greater investment capacity for the expansion of electric mobility.

On the other hand, if the allocation of power to a given output is made at the beginning of the charging session, at that output, and remains fixed in that session as in existing solutions, when the vehicle no longer needs all the power it was using, because its battery has a higher charge level, there will be times when available capacity will not be in use.

In the developed solution, the allocation of power to the outputs of each station is dynamic, making it possible to withdraw unused power in a given output, allocating it to another output in multiples equal to the unit conversion power, in this example 50 kW, and thus, a vehicle whose battery does not have access to all the power it can charge, it shall now have access to more power, and to receive more power in its terminal, thus leading to a more efficient and faster charging.

It should be noted that there are solutions on the market that use modules or power cells, the vast majority with fixed allocation to a charger and at each output thereof, and in some cases with defined allocation at the beginning of the process. The solution presented in this invention introduces the dynamic allocation of cells to the outputs, treats a set of chargers as a single system that can share the available conversion power, and introduces the concept of combining simultaneous charge with sequential charge.

More specifically, innovations are introduced in terms of the dynamic allocation of modules, or power cells, at each charging station output. The centralized allocation of said cells is performed dynamically to several charging outputs, each charging area being able to have any number of outputs, of any standard, and of any power. The concept therefore treats the various stations in a charging area as a single system, sharing power with each other. This dynamic allocation of power cells distributed by the system, allows to combine the concepts of sequential and simultaneous charging.

The developed solution allows, therefore, to combine the concepts of simultaneous and sequential charging in a single solution. The concept is based on the charging process wherein electric vehicle batteries typically charge up to a certain percentage of the battery's capacity using the maximum power they accept or made available to them, a power that will decrease down to zero from a certain point. The idea is to take advantage of this availability of power in the last charging phase, to route it to the next vehicle connected to the charging area, so that it starts charging before the first one finishes its charging cycle, maximizing the full use of the installed infrastructure and reducing total charging times. The process of power allocating and its delivery to the following vehicles continues in a sequential manner.

In addition to the aforementioned operational characteristics, innovations are also introduced in terms of physical equipment/hardware that translate into a completely new experience for the user.

The proposed charging station example incorporates a screen that occupies the front of the user interface, and also a sound system, which can have multiple functionalities.

The touch screen in the user interface, makes the usage of the charging station easyer, displaying relevant information about the charging process, and simultaneously multimedia content among which we can find, in a non-limiting manner, generic information (interactive or not), videos/photos (stored locally or disseminated via streaming) and varied entertainment information. The screen serves primarily to allow the user to interact with the charging station, or with the operator of the charging area (for example: service area, municipalities, commercial areas, hotels, restaurants, etc.). The solution may allow to order and make payments related to other types of products and services in addition to the vehicle battery charging service.

Charging stations will also be equipped with a two-way audio system that includes audio input through the incorporation of a microphone, and audio output through the incorporation of speakers.

The incorporation of human-machine interface systems is increasingly becoming a reality in this area, but, for the most part, they do not have satisfactory characteristics that allow the diversification of their use for wider purposes beyond the strict charging of vehicles.

Charging stations also incorporate a cable management system, for the extension and retraction of the charging cable. This system allows the use of longer cables, allowing the connector to reach the entry positions in the vehicle further away, preventing the cables from being on the floor, or dragging along a part of their extension, when they are in use or at rest, thus minimizing wear and dirt and extending its useful life.

The proposed solution uses a motorized system to carry out the extension and retraction of the charging cable, guaranteeing its tensioning, distinguishing itself from the existing systems in that it is not necessary to make efforts to actuate the system, both in the extension and in the retraction of the cable, the activation of the cable management system is made by a control system that detects when the user pulls the cable, and extends the charging cable by itself, and when the user puts the connector back in the support, the system retracts the cable by itself. The existing solutions on the market do not include this type of system, since they only use passive elements such as springs, elastics and/or counterweights to control the retraction of the charging cable, being cumbersome and sometimes leading the cable to also apply strains on the vehicle's connector inlet during charging.

Another feature incorporated in this new system, is based on the remote monitoring of the operating status of the stations. This is disruptive in technological terms when considering the products currently on the market, since it uses the verification and control of a vast set of data that, in addition to being able to be analyzed locally, are sent to a dedicated platform that allows to optimize the actions of preventive and corrective maintenance. The platform, which is connected to maintenance, operation and ERP management systems, can also take advantage of the use of artificial intelligence algorithms for the diagnosis and correlation of events, determining the status and/or need for intervention in the equipment. This factor is decisive in the optimization of the maintenance management process, allowing to improve the allocation of resources, minimizing operational response times and operating costs.

BRIEF DESCRIPTION OF THE DRAWINGS

For an easier understanding of the present application, figures are attached herein, which represent embodiments that however are not intended to limit the technology disclosed herein.

The charging stations (K), equipped with a communications network for charging control (113) for communication with the HUB (105), also comprise a series of devices such as the user interface controller (IC), display, switch, central command, controllers for the standards the charger might have, CCS, CHAdeMO among others, and also the direct current (DC) meters for these outputs.

Figure 5:
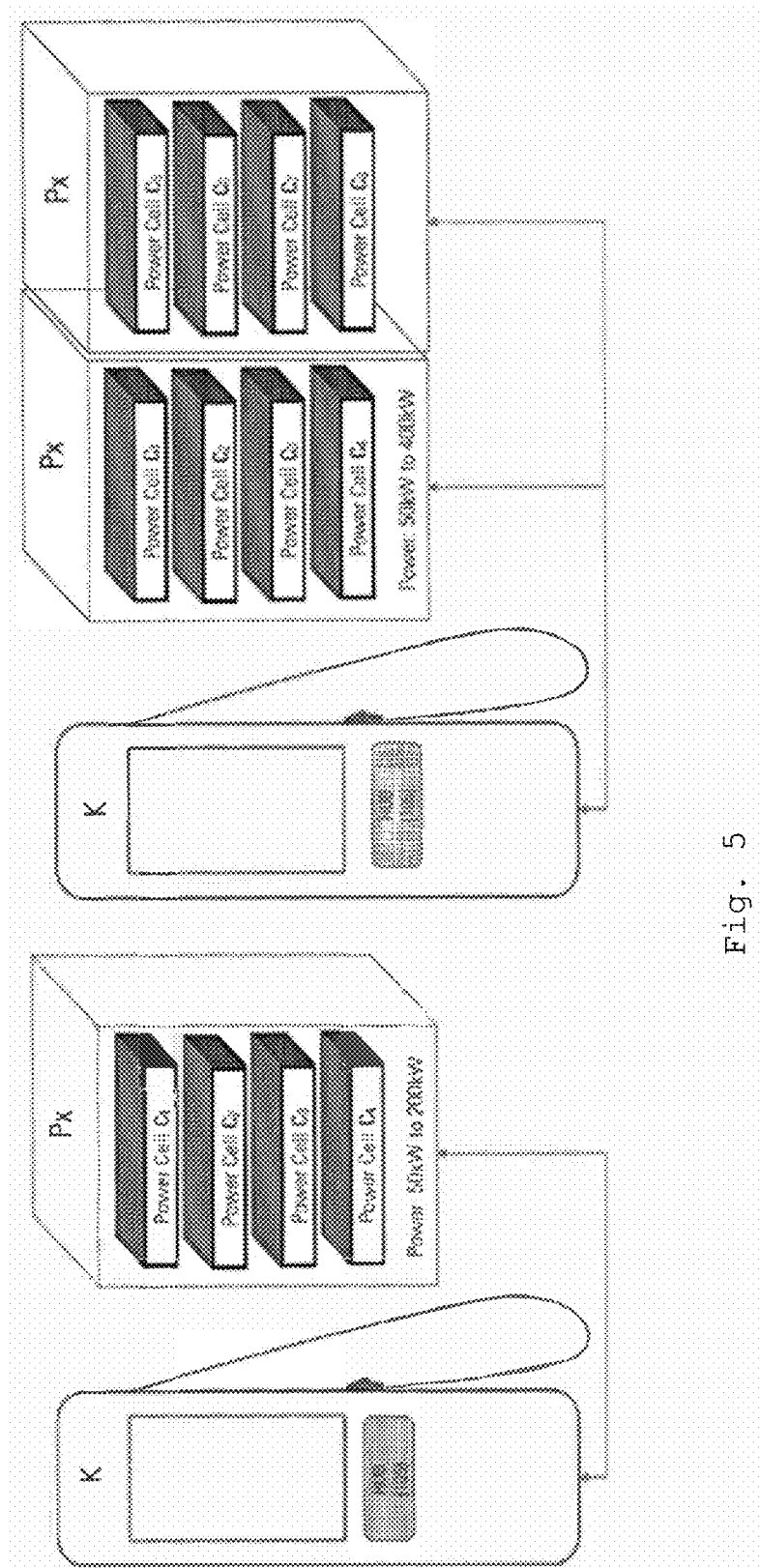

FIG. 5 illustrates the different combinations of power cells in a stand-alone solution wherein the charging station (K) is only one, and uses a functional HUB (105) for performing the selection of the allocation of the power cells (C) of the power unit (P) to the charging station outputs (N).

Figure 6:
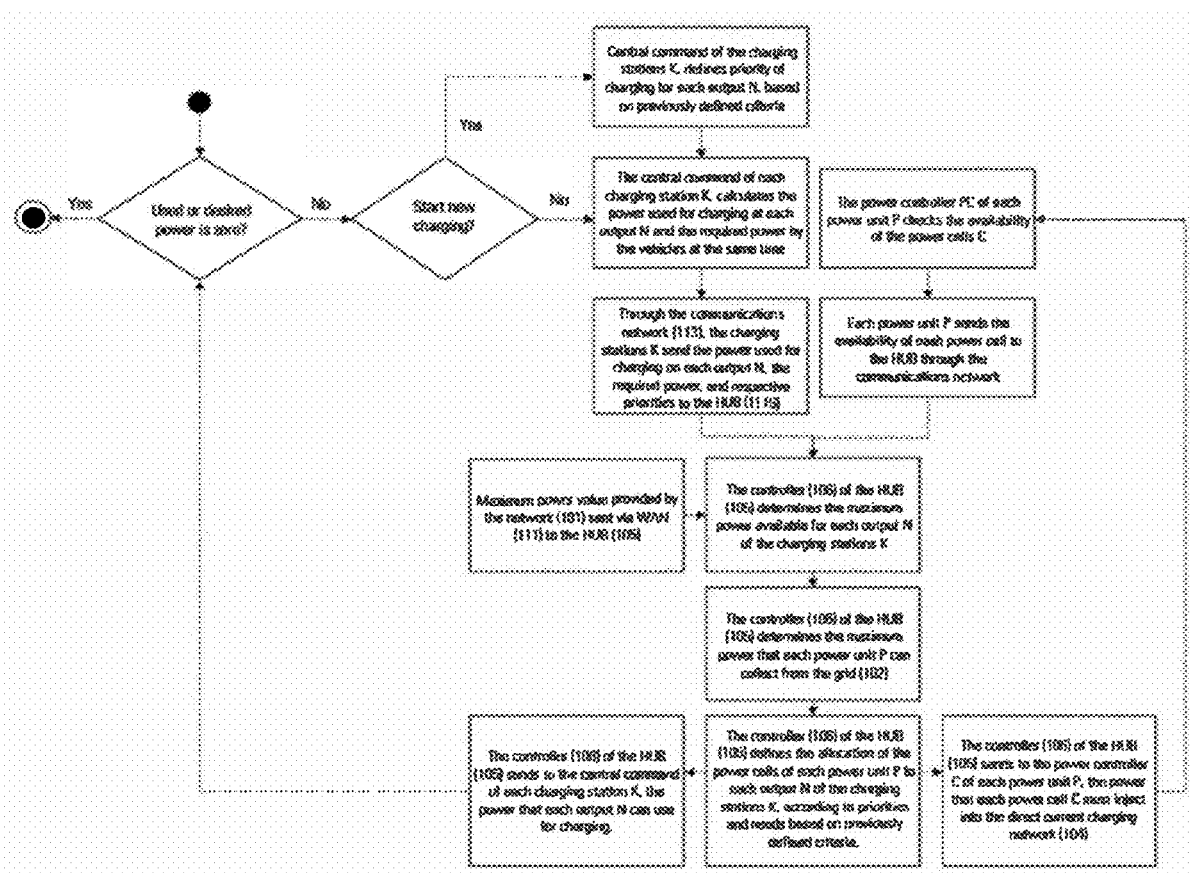

FIG. 6 illustrates the dynamic power allocation process of the system, when there is more than one charger and one HUB.

DESCRIPTION OF EMBODIMENTS

Referring to the figures, some embodiments are now described in more detail, which are not intended, however, to limit the scope of the present application.

The present application describes a intelligent charging system for electric vehicle batteries in direct current.

Figure 3:
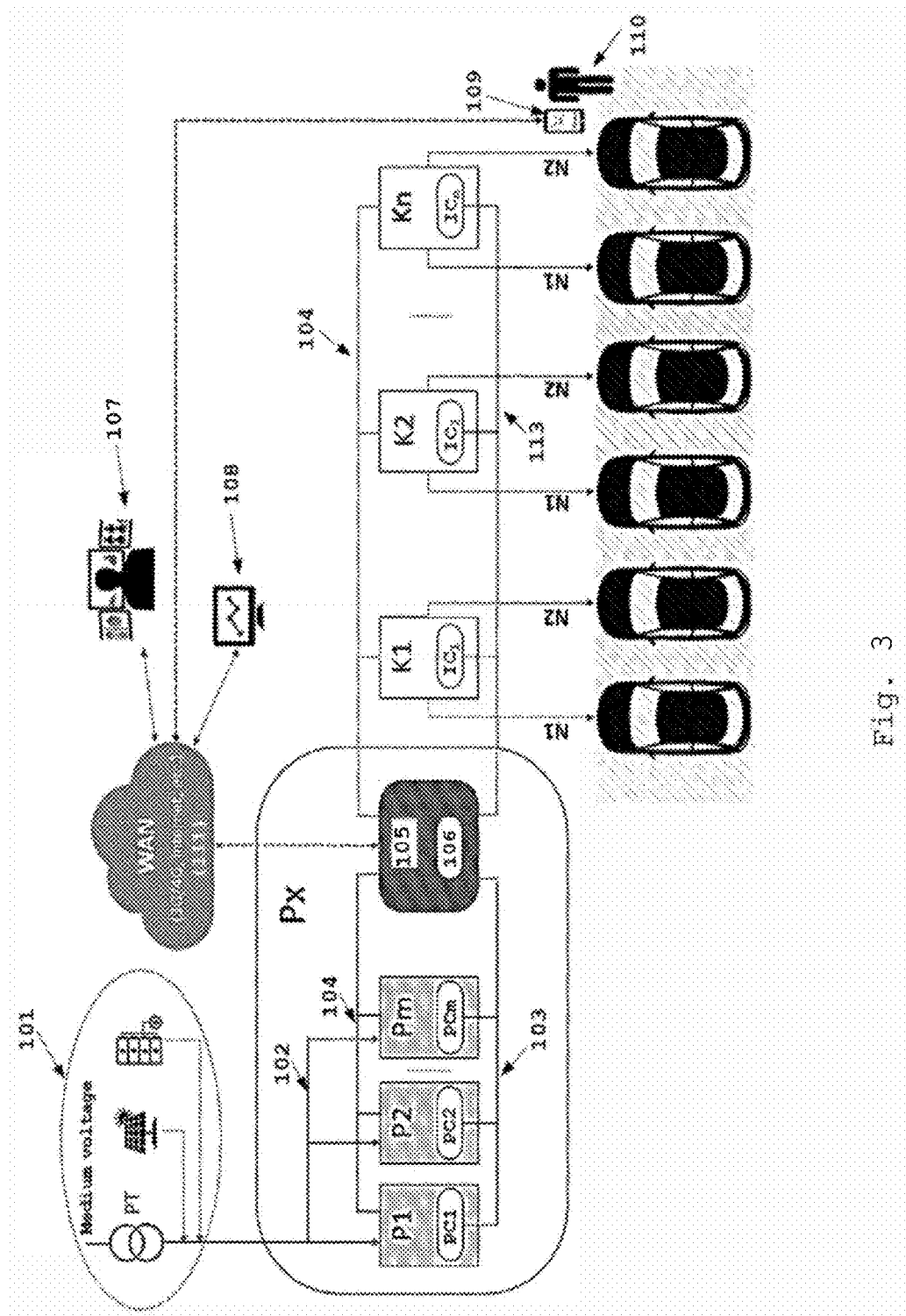
FIG. 3 illustrates the architecture of the system developed according to a block approach, and for charging areas with more than one charging station (K) with (N) vehicle charging outputs, wherein (101) represents the electrical grid at medium voltage (MV) and which may comprise the use of a transformer station and optionally other sources, such as solar panels, battery bank, etc. (Px) represents the power block, which is comprised of at least 1 to m power units (P) powered by the low voltage power grid (102). (PC) represent the power controllers (of 1 to m units) which are connected to a controller (106) of the HUB (105) through a communications network for power control (103). The HUB (105) may be connected to remote charging management systems (107), online monitoring systems (108) or mobile phone applications (109) via wired or wireless communications networks (111). (IC) represents the at least 1 to n interface controllers present in each of the (K) charging stations and which enable interaction with the user (110).

In one of the embodiments proposed for carrying out the system, and according to FIG. 3, is based on the operation of the solution with a block architecture, integrated in the power grid and in the operation and management of the charging network.

The grid (101) supplies the power block (Px) with energy, which can be supplemented with local generation from renewable sources and/or with local energy storage. The power units (P) receive the electrical power (102) which, as indicated by the respective controller (106), direct to the HUB (105), which acts as a command and control center.

It is at the HUB (105) where the process of power management and distribution, for solutions with more than one charger, is controlled in an intelligent way. The HUB (105) checks the power required at each of the outputs (N) for the charging process, information that is provided by each power controller (PC) associated with the central command of the charging station (K), and, using this information, establishes the energy supply matrix: inputs m x outputs n. All the exchange of commands for the energy component, communications between interfaces and the grid management system, when there is more than one charging station (K), are performed by the HUB (105).

Figure 4:
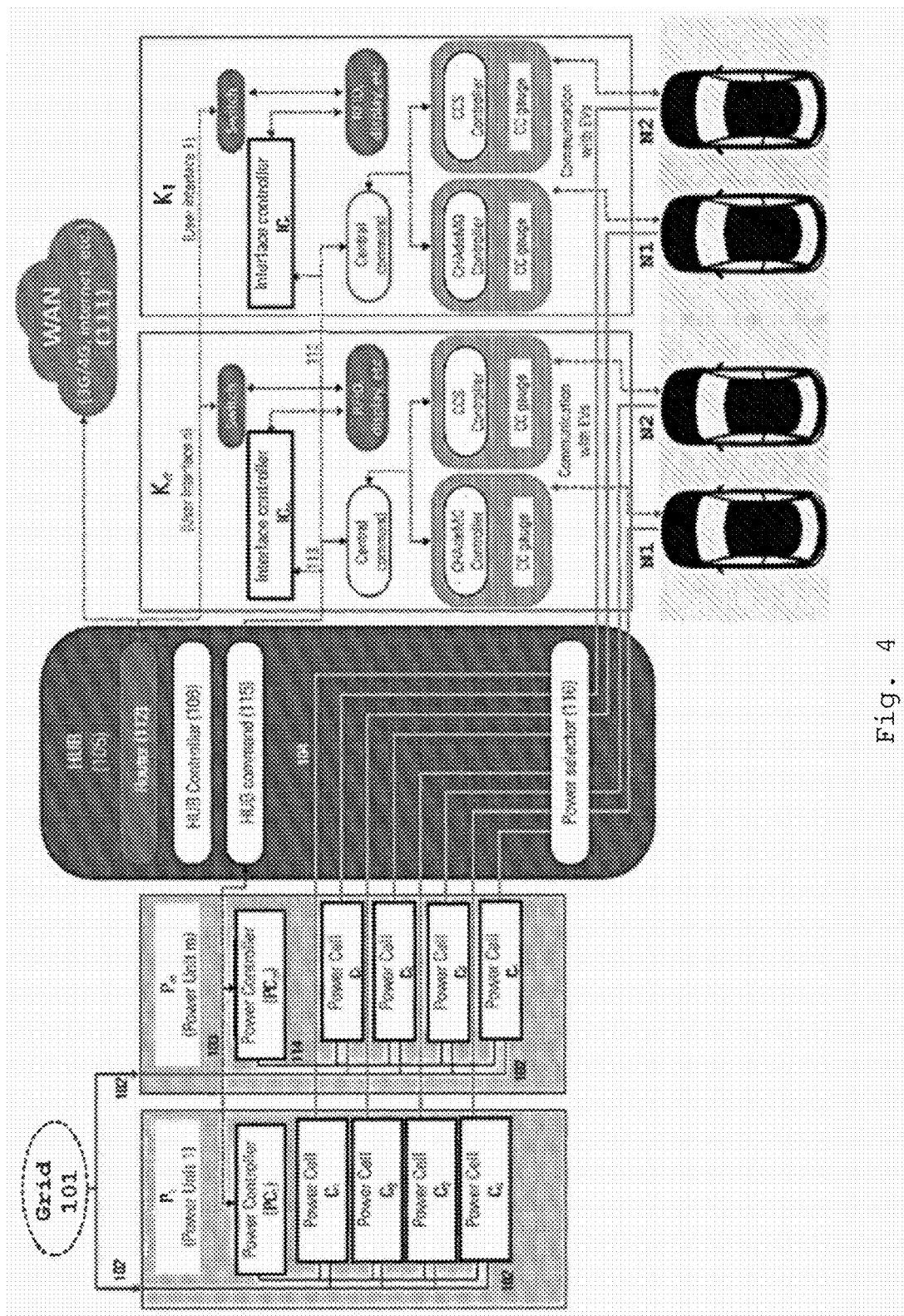
FIG. 4 illustrates schematically and in blocks, the power and communications components of the charging areas (1), wherein (101) represents the MV electrical supply grid, (102) represents the power grid in low voltage (LV) that supplies the power units (P) comprising the power controllers (PC) and the power cells (C). The low voltage power grid (102) supplies the power cells (C), and these are controlled by a power controller (PC) through an internal power control network (114). The power controller (PC) is in turn managed by the command (115) of the HUB (105) and the respective controller (106) of the HUB 105, through the communications network for power control (103). The power selector (116), managed by the controller (106), ensures that the power present and made available at its inputs, identified by (104), as a direct current (DC) charging network, coming from the power cells (C) of the power units (P), is correctly conducted and made available at the outputs of the charging stations (K). The HUB (105) may also comprise a router (112) for bidirectional communication with fixed or mobile telecommunications networks.

Referring to FIG. 4, this shows how control and communication connections are made within the main blocks of the proposed solution, as well as the matrix that dynamically connects the m inputs and n outputs. Each of these internal elements is constantly being monitored and information on the different parameters is collected for the system to operate. In the charging station (K) with user interface it is possible to have any combination between two fast charging standards available, or future standards to be made available, where in one of the proposed embodiments, a CHAdeMO and a CCS connection is used, two CHAdeMO connections, two CCS connections or where only one unit output is used, CHAdeMO outputs, CCS outputs or any other intended standard would be used, such as GB/T. There is also the possibility for a charging station with user interface (K) to have more than two outputs (N) in any combination. For a description of the operation of the system, we will consider the detection of a new charging session, in this case the central command of the charging stations (K), defines priority of charging for each output (N), based on previously defined criteria. Then, the central command of each charging station (K), calculates the power used for charging at each output (N), charges that are already in progress and the power desired by the vehicles at the same time. Through the communications network (113), the charging stations (K) send the power used for charging at each output (N), the desired power and respective priorities, to the HUB (105). When the HUB (105) receives this information, and with the value of the maximum power provided by the grid (101), via the telecommunications network (111), the HUB (105) determines which is the maximum power available for each output (N) of the charging stations (K) and the maximum power that each power unit (P) can collect from the grid (102). With the previous information, the controller (106) defines the allocation of the power cells (C) of each power unit (P) to each output (N), of the charging stations (K), according to priorities and needs based on previously defined criteria.

Subsequently, the controller (106) sends to the power controller (PC) of each power unit (P), via the communications network (103), the power that each power cell (C) must inject into the charging network in direct current (104) and sends to the central command of each charging station (K), the power that each output (N) can use for charging.

During the previously described process, the power controller (PC) of each power unit (P), checks the availability of the power cells (C) of each power unit (P) and sends that availability to the HUB (105) through the communications network (103).

If at the beginning of the process, it is verified that in at least one output (N) power is still needed, and a new charging session hasn't started, then the priorities are already defined and the process starts with the central command of each charging station (K), which calculates the power used for the charging in progress at each output (N) and the power desired by the vehicles at the same time, and the above steps are once again repeated.

Referring to FIG. 5, where the stand-alone solution is exemplified, each power cell (C) of the charging station (K) has a capacity of 50 kW and each power unit (P) has four cells (C), being neither limiting nor conditioning to any of the proposed embodiments, wherein this number may be lower or higher than the 4 cells. Thus, and with the four cells with an individual capacity of 50 kW, the total installed power makes a total of 200 kW. Alternatively, and when there is a need for greater availability of power at the output of the charging stations (K), the solution involves adding a power unit (P), with one or more 50 kW power cells. The values are exemplary and refer to the examples already named. The solution is applicable to any value for the power cell (C) and any maximum value for the power unit (P).

Figure 1:
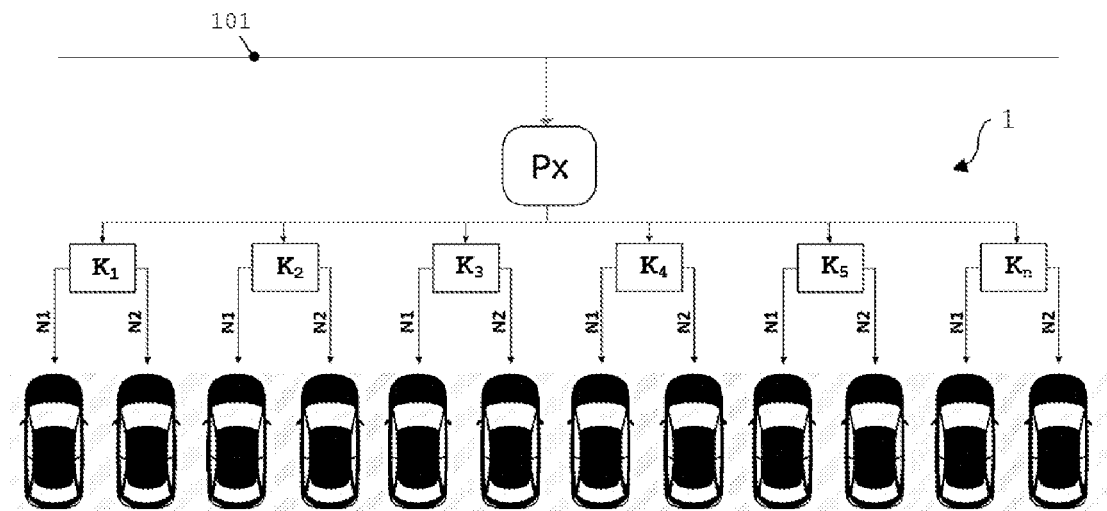
FIG. 1 shows the proposed system for the vehicle battery charging areas, represented by reference 1, wherein in one of the proposed embodiments, (101) represents the electrical supply grid, (Px) represents the power block, (K) represents a charging station with user interface and (N) represents the number of outputs of each charging station, wherein (N1) represents charging output 1 and (N2) represents charging output 2. Each charging area (1) may have between 1 and n charging stations, i.e., ($K_j$) and ($K_n$), supplied by the power block (Px) as shown.
Figure 2:
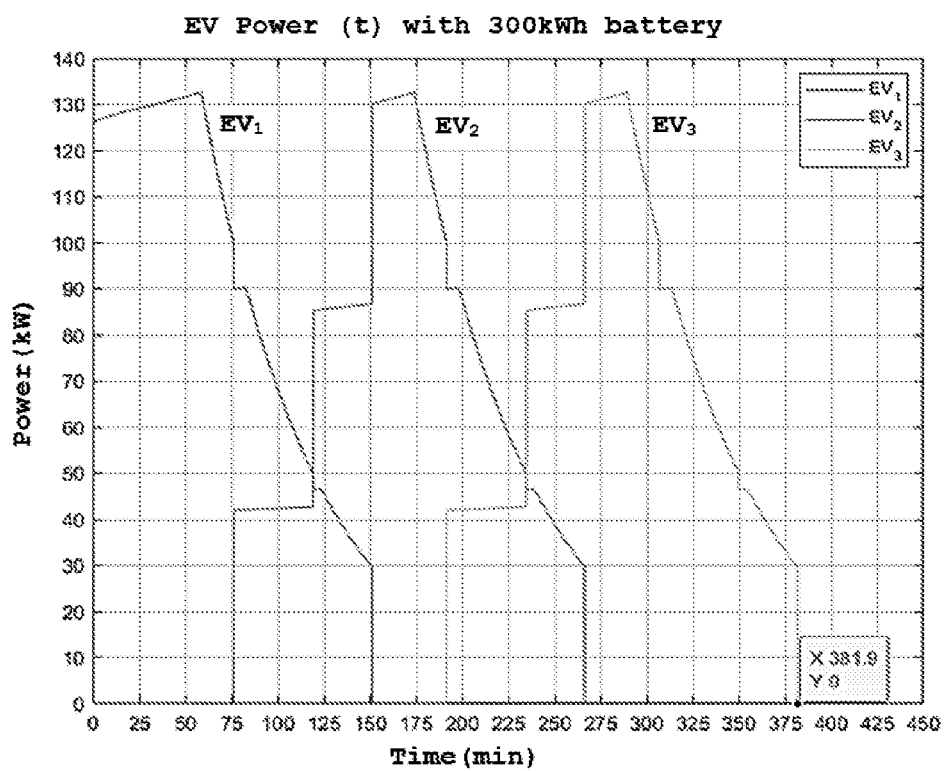
FIG. 2 illustrates the availability of charge at the charger outputs, in a charging cycle for automotive batteries, in an example wherein three vehicles are connected simultaneously in a charger with 3 outputs and with 3 cells of 50 kW each, combining the concept of sequential and simultaneous charging.

Graphically, the charging cycle for one of the proposed embodiments wherein there is a charger with 3 outputs and with 3 cells of 50 kW each, is shown in FIG. 2 of this document. Here, it is considered that the charging station has an available power of 150 kW and the battery of vehicles 300 kWh. Here, it is possible to verify that there is a dynamic allocation of the power cells to the outputs in multiples of 50 kW. When the first vehicle consumes less than 100 kW, then one of the power cells is no longer allocated to its charge and is now allocated to a second vehicle. As soon as the charge of the first vehicle consumes less than 50 kW, a second 50 kW cell is no longer allocated to the first vehicle, but is allocated to the second vehicle. When the first vehicle finishes charging, the third cell in use is also allocated to the second vehicle. The sequence is repeated between the second and third vehicles, and the following.

It is clear that, while the first vehicle takes the same time to charge that it would take in a situation of sequential charging as those in the market, the following vehicles will reach full charge in a shorter time, because before consuming the maximum power provided by the three cells, they have already received some charge during the charging of the previous vehicle. With a sequential solution, as it is possible to find in the market, the charging of these 3 vehicles will take 450 minutes to end (3×150 minutes), with the proposed sequential and simultaneous solution, the time needed to charge the 3 vehicles is 382 minutes.

In the example of FIG. 2, the estimated gain is 68 minutes. The time gain is cumulative for each additional vehicle that is included in the charging process. In the example described, the gain is 34 minutes for each vehicle after the first. For different charger powers and for different battery capacities the gain will be different. In many situations it is even possible to charge one more vehicle in the same total time as the existing solution.

The coexistence of the concepts of sequential charging and simultaneous charging, which is allowed by the dynamic allocation of power to the outputs, turns the gains in terms of investment and in terms of efficiency in the operation of the fleet into evident.

The present description is, of course, in no way restricted to the embodiments presented herein and a person of ordinary skill in the art may provide many possibilities of modifying it without departing from the general idea as defined in the claims. The preferred embodiments described above are obviously combinable with each other. The following claims further define preferred embodiments.

FIG. 6 shows the dynamic power allocation process of the system, when there is more than one charger and one HUB. At the beginning of the process, and if the power used or desired is not zero, the start or not of a new charging session is validated. If so, the central command of the charging stations (K) defines the charging priority for each output N, based on the previously defined criteria. If not, the central command of each charging station (K) calculates the power used for charging at each output (N) and the power desired by the vehicles at the same time.

Subsequently, the charging stations (K) send the power used for charging at each output (N), the desired power and the respective priorities via the communications network (113) to the HUB command (115).

The next step, and after sending the value of the maximum power provided by the communications network (113) to the HUB (105), the controller (106) of the HUB (105) determines which is the maximum power available for each charging station (K) output (N), and also determines the maximum power that each power unit (P) can collect from the grid (102). The controller (106) then defines the allocation of the power cells (C) of each power unit (P) at each charging station (K) output (N) according to priorities and needs based on previously defined criteria, sending to the central command of each charging station (K) the power that each output (N) can use for charging. The controller (106) also sends to the power controller (PC) of each power unit (P) the power that each power cell (C) must inject into the direct current (104) charging network, the power controller (PC) of each power unit (P) being responsible for checking the availability of power cells (C), subsequently sending that information to the HUB (105) via the communications network (103).

The invention claimed is:

1. A charging system for electric vehicle batteries, characterized in that the system comprises
    at least one charging station (K) configured to be connected to a direct current charging network (104);
    two or more direct current charging outputs (N) provided within the at least one charging station (K), wherein each direct current charging output (N) is configured to allow the use of different charging standards, such as Combined Charging System (CCS), CHAdeMO, GB/T, Chaoji;
        wherein each charging station further comprises
            a central command; and
            a cable management system, configured to let the charging cable be extended when a user pulls it and to retract the cable when the user releases it;
    a power block (Px) configured to be electrically powered by a low voltage grid (102), comprising
        at least one power unit (P), comprising
            at least one power controller (PC); and
            two or more power modules (C) configured to be controlled by the at least one power controller (PC);
    a HUB (105), comprising
        a router (112);
        a controller (106);
        a HUB command (115); and
        a power selector (116), configured to be controlled by the controller (106);
    a wired or wireless telecommunication network (111);
    at least one remote system (107, 108, 109);
        wherein said at least one remote system is selected from the group consisting of a remote charging management system (107), a monitoring system (108) and a mobile phone application (109);
        and wherein said router (112) is configured to enable communication with said at least one remote system (107, 108, 109), by using said wired or wireless telecommunication network (111);
    a first communications network (103);
    a second communications network (113);
wherein
the at least one power controller (PC) is configured to be connected to the controller (106) via the first communications network (103), and
the at least one charging station (K) is configured to be connected to the HUB (105) via the second communications network (113);
wherein
the controller (106) is configured to
    control the power provided by the direct current charging network (104) to the at least one charging station (K) configured to be supplied by at least one of the two or more power modules (C);
    act on the power selector (116); and
    act on the at least one power controller (PC).

2. The charging system according to claim 1, wherein the low voltage grid (102) that electrically powers the power block (Px) comprises energy sources such as local generation, storage banks, electrical traction grids, or others.

3. The charging system according to claim 1, wherein the two or more power modules (C) comprise a predefined maximum power value.

4. The charging system according to claim 1, wherein said monitoring system (108) is configured to perform the permanent monitoring of the charging system and to optimize a decision process on the need for preventive and/or corrective maintenance actions based on predictive algorithms.

5. The charging system according to claim 1, wherein each charging station (K) comprises a user interface and an interface controller (IC).

6. The charging system according to claim 1, wherein the at least one charging station (K) comprises an interface comprised of at least one touch-sensitive screen, wherein the interface comprises a two-way audio system and said at least one touch sensitive screen and the two-way audio system are configured to facilitate the interaction and operation of the at least one charging station (K) and a broadcast of multimedia content.

7. A method of operation of the charging system for electric vehicle batteries described in claim 1, characterized in that the method comprises the steps of:
    checking whether a used or desired power is zero or not, validating the start or not of a new charging session;
    in case of a new charging session starts, the central command of the at least one charging station (K) defines a charging priority for each output (N);
    in case there isn't a new charging session, the central command of each charging station (K) calculates the power used for charging at each output (N) and the power desired by the vehicles at the same time;
    subsequently, the at least one charging station (K) sends the calculated power used for charging at each output (N), calculated by the charging station central command in the previous step, the desired power and the respective charging priorities for each output (N) via the second communications network (113) to the HUB (105);
    after receiving the value of the maximum power provided by the grid through the telecommunications network (111), the controller (106) of the HUB (105) determines the maximum available power for each output (N) of the at least one charging station (K), and also determines the maximum power that each power unit (P) can collect from the grid (102);
    the controller (106) then defines the allocation of the two or more power modules (C) of each power unit (P) at each charging station (K) output (N) according to the charging priorities, sending to the central command of each charging station (K) the power that each output (N) can use for charging;
    the controller (106) also sends to the power controller (PC) of each power unit (P) the power that each power module (C) must inject into the direct current (104) charging network, the power controller (PC) of each power unit (P) being responsible for checking the availability of the power modules (C), subsequently sending that information to the HUB (105) via the first communications network (103).

* * * * *